No. 759,775. PATENTED MAY 10, 1904.
W. N. TURNER.
APPARATUS FOR SEPARATING METALS FROM THEIR CRUSHED ORES OR MATERIALS CONTAINING SAME.
APPLICATION FILED DEC. 22, 1903.
NO MODEL. 4 SHEETS—SHEET 1.

WITNESSES
INVENTOR

No. 759,775. PATENTED MAY 10, 1904.
W. N. TURNER.
APPARATUS FOR SEPARATING METALS FROM THEIR CRUSHED ORES OR MATERIALS CONTAINING SAME.
APPLICATION FILED DEC. 22, 1903.
NO MODEL. 4 SHEETS—SHEET 2.

WITNESSES
INVENTOR

No. 759,775. PATENTED MAY 10, 1904.
W. N. TURNER.
APPARATUS FOR SEPARATING METALS FROM THEIR CRUSHED ORES
OR MATERIALS CONTAINING SAME.
APPLICATION FILED DEC. 22, 1903.
NO MODEL.

4 SHEETS—SHEET 3.

WITNESSES

INVENTOR

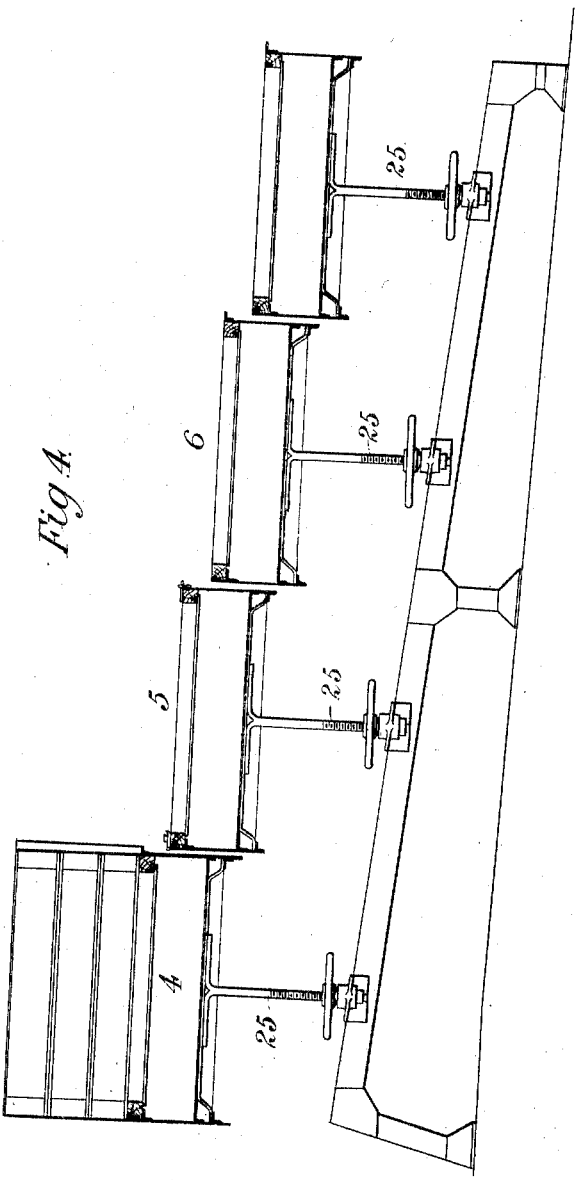

No. 759,775. Patented May 10, 1904.

UNITED STATES PATENT OFFICE.

WILLIAM NEALE TURNER, OF IPSWICH, ENGLAND.

APPARATUS FOR SEPARATING METALS FROM THEIR CRUSHED ORES OR MATERIALS CONTAINING SAME.

SPECIFICATION forming part of Letters Patent No. 759,775, dated May 10, 1904.

Application filed December 22, 1903. Serial No. 186,222. (No model.)

*To all whom it may concern:*

Be it known that I, WILLIAM NEALE TURNER, a subject of His Majesty the King of Great Britain, residing at 2 Henley road, Ipswich, England, (temporarily of Lytton, British Columbia,) have invented a certain new and useful Improvement in Apparatus for Separating Metals from Their Crushed Ores or Materials Containing Same, of which the following is a specification.

In the separation of, say, gold from the alluvial dirt containing same or when treating crushed ore coming from the batteries it is common to run the material over separating-tables covered, for example, with cocoanut-matting, with superposed expanded metal to form riffles.

The nature of the present invention being described with reference to the treatment of alluvial gold-bearing substances by what is known as the "dredger" process, its application for the treatment of other classes of ore will be obvious.

According to this invention it is proposed to carry the ore passing through the revolving screen into a box or receptacle, which may be divided so as to take the different sizes and from which the feed is either to a single set of tables or to a divided set, as the case may be. In either case between the receiving vessel and the separating-tables are placed a series of gates or sluices opening into separate channels, which in turn pass to separate tables in order that one or more of such tables may be instantly thrown out of action for cleaning or repairs without stopping the flow of slime or material. The channels may be provided with adjustable baffle-plates, so as to direct the flow onto any given part of the tables, so as to secure the uniform depth of substances flowing over same, and the tables may be formed of plates upon which are placed removable sections of the matting and expanded-metal or other collecting device.

Figure 1:
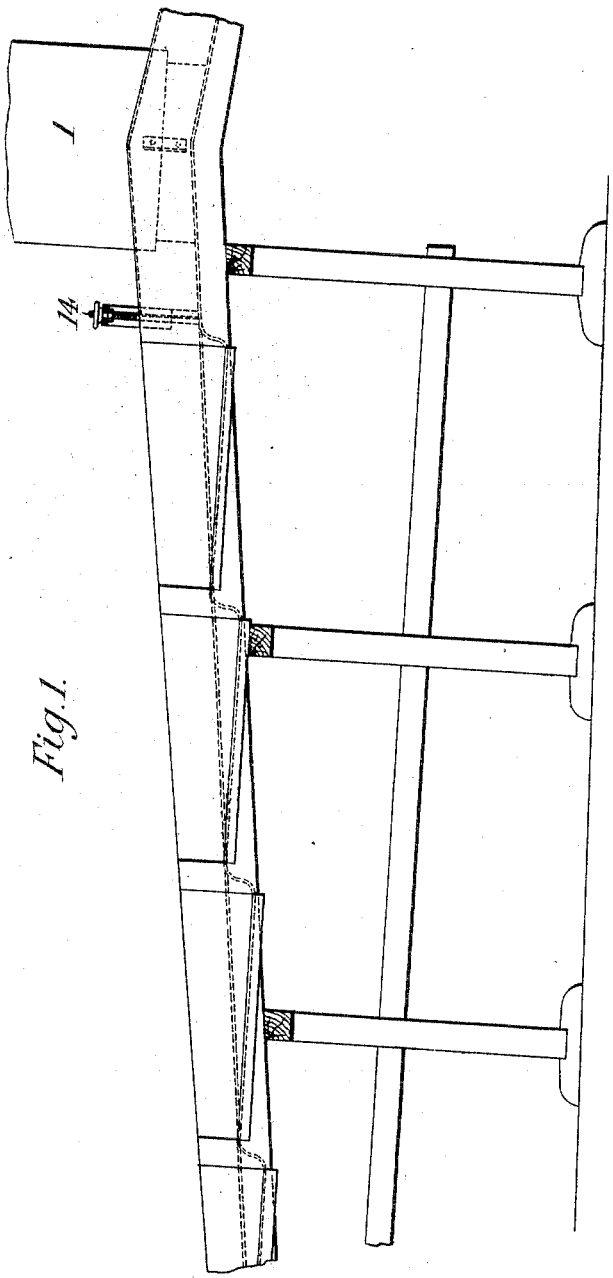
Figure 2:
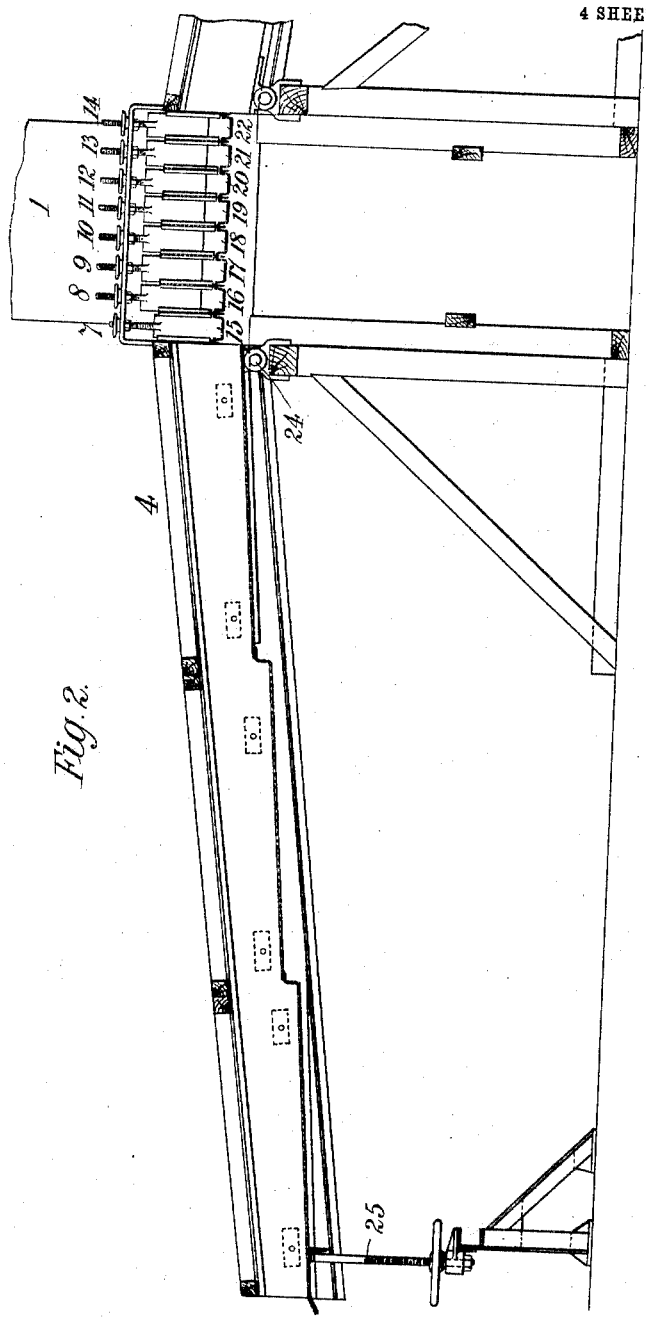
Figure 3:
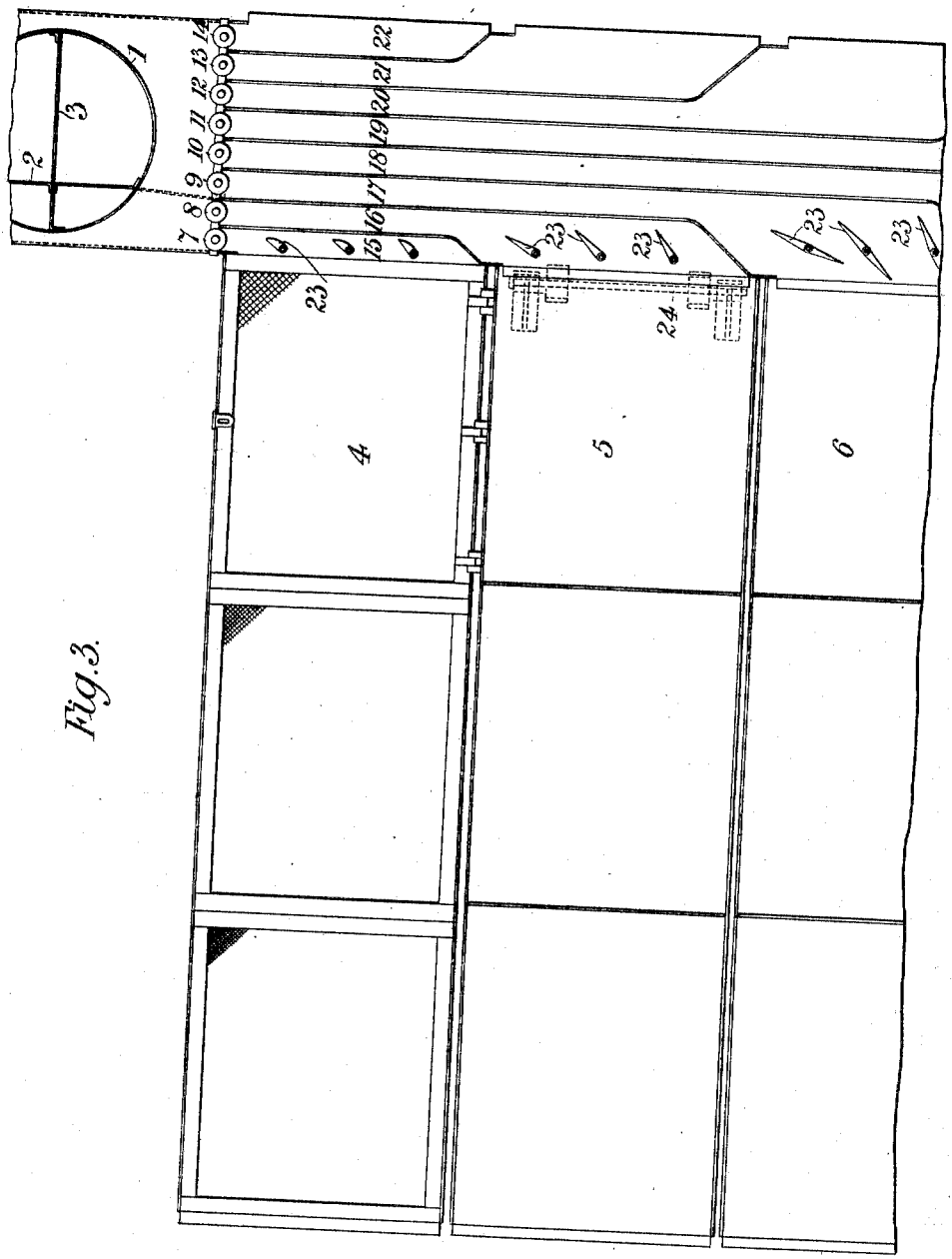

In the accompanying drawings, Figure 1 is a side elevation illustrating one form of the apparatus. Fig. 2 is a sectional elevation close to the sluices. Fig. 3 is a plan view, and Fig. 4 shows how the height of the separate tables may be adjusted.

The material to be separated is passed from the usual revolving screen or other source of supply (not shown) into a box or receptacle 1, which may be provided with one or more vertical division-plates 2 to roughly divide the different sizes of material, while if a double set of tables is employed a further division-plate 3 may be employed.

Between vessel 1 and separating-tables 4 5 6, and so on are a series of gates or sluices, of which eight are shown, (numbered 7 to 14, inclusive.) Each gate opens into a separate channel (indicated by 15 to 22) leading to its respective table, and such channels are preferably provided with adjustable baffles 23, so that the direction of flow to the tables may be varied as desired, while the speed of flow down the tables may be regulated by pivoting said tables at 24 and carrying their other ends in adjusting-screws 25.

What is claimed is—

1. In an ore-separating apparatus, the combination with the separating-tables, of a receiving vessel, division-plates therein, and means for distributing the matter under treatment to the several tables, consisting of a series of channels, a vertically-adjustable gate at one end of each channel, and a series of sets of adjustable baffles, one set for each table, said sets progressively increasing in size from the set nearest the receiving vessel, substantially as described.

2. In an ore-separating apparatus, the combination of a receiving vessel, provided with vertical partitions, a series of adjustable tables, and a distributing apparatus, said distributing apparatus being composed of a series of channels arranged in sets, one set communicating with one division in the receiving vessel, a vertically-adjustable gate at the head of each channel, each of said channels communicating with one of said tables respectively, and a series of sets of baffle-plates, one set for each table, said sets progressively increasing in size from the table nearest the receiving vessel, substantially as described.

In testimony whereof I have hereunto set my hand in the presence of two subscribing witnesses.

WILLIAM NEALE TURNER.

Witnesses:
NEIL W. FLENNER,
W. C. SAWERS.